ly precision.

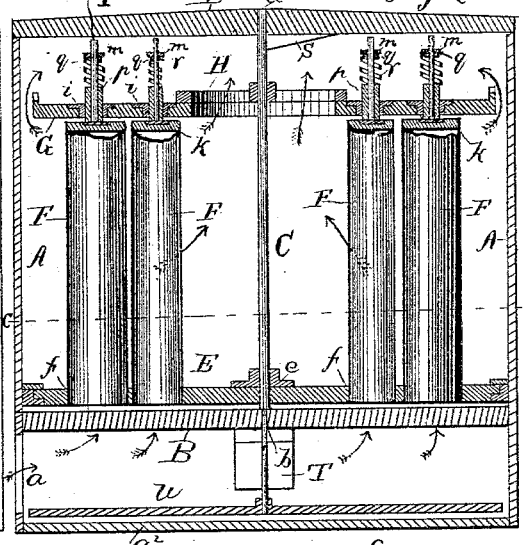

UNITED STATES PATENT OFFICE.

ALEXANDER INGRAHAM, OF MINNEAPOLIS, MINNESOTA.

DUST-COLLECTOR.

SPECIFICATION forming part of Letters Patent No. 318,989, dated June 2, 1885.

Application filed August 23, 1884. (No model.)

*To all whom it may concern:*

Be it known that I, ALEXANDER INGRAHAM, residing at Minneapolis, in the county of Hennepin and State of Minnesota, have invented certain new and useful Improvements in Dust-Collectors, of which the following is a specification, reference being had therein to the accompanying drawings.

This invention relates to dust-collectors used in milling; and it consists in the combinations of parts and details of construction hereinafter pointed out and claimed.

The object of the invention is to produce a machine which will clear the dust-receivers with certainty and precision.

In the drawings, Figure 1 is a plan view of the frame and driving-gear. This gear may be either at bottom or top. Fig. 2 is a vertical central section of the device, showing the dust-cylinders in elevation, partly broken away. Fig. 3 is a diagrammatic view on the section-line *c c*, Fig. 2, showing the arrangement of the dust-collecting cylinders and location of dust-trough. Fig. 4 is a detached view of a dust-cylinder over the dust-collecting trough. Fig. 5 is a detail showing dust-tube collapsed.

A indicates the inclosing-box, through which a current of air is made to pass in an upward direction, either by blast or suction, as indicated by the arrows, the air entering at *a*. A cross-bar, B, in the lower portion of the box, has a bearing, *b*, for upright shaft C, which shaft has another bearing, *d*, in the cross-bar D at the top of the box.

The shaft C carries a perforated disk, E, near its lower end, the disk being secured to the shaft in suitable manner, as by collar *e*. The disk E is perforated at *f f* for the reception of hollow dust tubes or bags F. The disk E is preferably of wood, and the tubes or bags F can be easily tacked around the inside of the holes *f*.

A disk, G, is attached to shaft C at a little distance above disk E, and is secured to the central shaft, C, by a spider, H, which has an open passage through its center to permit the escape of air. The disk G has perforations over each of the holes *f* in disk E. These perforations serve as bearings for rods I, and may have bushings *i* around said rods.

The tubes or cylinders F are of flannel or similar fabric, and each one has a head, *k*, which is preferably a wooden disk secured to the fabric of the bag. Rods I are attached to these heads K by screws or rivets extending through heads on said rods.

Above the disk G are loops or bridges *m*, each extending over a perforation in the disk, and having holes to correspond with the holes in said disk. These bridges serve as guides for the upper ends of rods I.

Sleeves *p* surround the lower ends of rods I, and a nut or stop, *q*, is secured near the upper end of each rod. Between the sleeve and stop a spiral spring, *r*, surrounds each rod.

Disk G is compelled to revolve by suitable gearing, as will be explained, and the dust-bags are of course carried with it.

An inclined piece, S, is fixed above the bridges *m*, so as to stand in the path of movement of the upper ends of rods I. The engagement of the rods with this incline will depress the rods and the upper ends of the dust-bags against the pressure of springs *o* as the rods pass under piece S. As the rods pass beyond the lower edge of piece S the springs will bring them up suddenly, and so jerk upon the upper ends of bags F, which had been partially collapsed lengthwise while passing under the inclined piece.

Below the dust-bags, and about in line with the lower edge of the inclined piece S, there is a trough, T, which will receive the dust shaken from the interior of the bags F. This trough conveys the dust away, either by gravity down an incline or by a conveyer of usual construction.

A gearing, 1, on the disk G, or it may be on disk E, is engaged by a gear-wheel, 2, on short shaft 3, and a large gear, 4, on the same shaft, is driven by small gear 5 on shaft 6, which shaft is driven by a pulley, 7, from any convenient motor. By this system of gearing a slow and steady movement may be imparted to the revolving disks which carry the dust-bags.

I have referred to the dust-tubes F as cylinders, but it is apparent that they may be of other than cylindrical form. The arrangement of the disk E with holes therein permits the ready attachment of bags F by tacking the edges within the holes in the board E, so the tubes can be readily tacked to the head-pieces $k$, making the whole device very simple and cheap.

The air is prevented from escaping down into the trough T by means of a packing, $t$, at the edges of the trough. Said packing, of sheep-skin, felt, or similar material, closes the spaces between the edges of the trough T and the disk E.

Below the cross-bar B the rod C is reduced in size and carries a bar or scraper, $u$, which serves to carry round heavy particles of dust which may fall on the floor $a^2$ until the particles are in front of the aperture $a$, where the inflowing air-current is strong and will lift the particles and carry them up into the tubes. The constant current of air laden with dust through the fabric which constitutes tubes F soon loads the inner surface of these tubes with accumulated dust. The sudden jerk upon the fabric when the springs are released from the pressure of the inclined plate serves to dislodge this collected dust and deposit it in the trough T.

I claim—

1. The combination of the rotating disks E and G, the dust-tubes F, the spring-rods connected with the heads of said dust-tubes, and the inclined plate S, all relatively arranged substantially as described.

2. The combination, with the perforated disk E, of the dust-tubes F, secured inside said perforations, the heads $k$, secured inside the dust-tubes at their upper ends, the disk G, carrying bridges $m$, the spring-rods I, attached to the heads of the dust-tubes, and the inclined plate S, all substantially as shown and described.

3. The combination, with the inclosing-casing, of a rotating dust-collector a little above the bottom thereof, and a bar or sweep secured to and moving with said collector to agitate the dust on the floor of the casing, substantially as described.

4. The combination, with the rotating disks E G and the dust-tubes F, of the bridges $m$, the rods I, attached to the heads of the dust-tubes, the springs $o$, for pressing said rods upward, and the piece S, for depressing said rods, as described.

5. The revolving disks E G and the dust-tubes F, in combination with the driving-gear 1, the small gear 2, the shaft 3, gear 4, and small gear 5, whereby the disks are made to rotate slowly and with uniform movement, substantially as described.

6. The wooden disk E, having perforations, the tubes F, secured therein and provided with wooden heads $k$, in combination with means for supporting said tubes at their tops, substantially as described.

In testimony whereof I affix my signature in presence of two witnesses.

ALEXANDER INGRAHAM.

Witnesses:
N. F. PIERCE,
JOHN C. FAIRWEATHER.